United States Patent [19]
Szentesi et al.

[11] Patent Number: 6,044,193
[45] Date of Patent: Mar. 28, 2000

[54] FIBER OPTIC INTERCONNECTION ENCLOSURE HAVING A FORCED AIR SYSTEM

[75] Inventors: Otto I. Szentesi, Hickory, N.C.; Jon Paul Segelhorst, Euless, Tex.

[73] Assignee: Siecor Operations, LLC, Hickory, N.C.

[21] Appl. No.: 09/113,908

[22] Filed: Jul. 10, 1998

[51] Int. Cl.$^7$ .................................................... G02B 6/00
[52] U.S. Cl. ........................... 385/134; 385/135; 385/137
[58] Field of Search ..................................... 385/134–139

[56] References Cited

U.S. PATENT DOCUMENTS

| | | | |
|---|---|---|---|
| 5,825,962 | 10/1998 | Walters et al. | 385/135 |
| 5,956,450 | 9/1999 | Stieb et al. | 385/135 |

OTHER PUBLICATIONS

Siecor brochure, *High Density Frame,* Siecor Corporation, Hickory, NC, May 1994.
Siecor brochure, *LDC Hardware Product Family (LGX Compatible),* Siecor Corporation, Hickory, NC, Dec. 1995.
Siecor specification sheet, *Optical Cross–Connect Cabinet (OCC–051),* Siecor Corporation, Hickory, NC, Jul. 1996.
Siecor brochure, *FDC® Product Family Brochure,* Siecor Corporation, Hickory, NC, Aug. 1996.
Siecor specification sheet, *Optical Cross–Connect Cabinets OCC–031/OCC–031–G,* Siecor Corporation, Hickory, NC, Aug. 1996.
Siecor specification sheet, *Optical Cross–Connect (OCC–080–G),* Siecor Corporation, Hickory, NC, Oct. 1996.
Siecor brochure, *ACH™ Hardware Product Family,* Siecor Corporation, Hickory, NC, Apr. 1997.
Siecor brochure, *LANscape™ Hardware (Fiber Cabling Solutions For Premises Networks),* Siecor Corporation, Hickory, NC, Sep. 1997.
Siecor brochure, *LANscape™ Fiber Cabling Solutions For Premises Networks/Select Fiber Optic Products,* Chapter 3, Siecor Corporation, Hickory, NC, Dec. 1997, pp. 23–44.

*Primary Examiner*—Phan T. H. Palmer

[57] ABSTRACT

The fiber optic interconnection enclosure, such as a fiber optic distribution frame or the like, effectively limits the entry of particles, such as dust and other contaminants, into the enclosure. For example, the fiber optic interconnection enclosure can maintain a greater pressure, i.e., a positive pressure, within the internal cavity defined by the enclosure than outside of the internal cavity so as to effectively limit the entry of particles into the internal cavity, even as the door of the fiber optic interconnection enclosure is repeatedly opened and closed. The fiber optic interconnection enclosure generally includes at least one fan to draw air into the internal cavity through an air inlet port defined by the cabinet and to circulate the air through the internal cavity in order to reduce the number of particles that settle upon or are transferred to the end faces of the optical fibers or other surfaces within the internal cavity. By filtering the air drawn into the internal cavity, at least some of the particles are removed from the air drawn into the internal cavity. In addition, by expelling at least some of the air that has circulated within the internal cavity through a vent, a number of the particles that may have been otherwise trapped within the internal cavity can also be expelled prior to settling upon the end face of an optical fiber or other surfaces within the internal cavity.

20 Claims, 7 Drawing Sheets

FIBER OPTIC INTERCONNECTION ENCLOSURE HAVING A FORCED AIR SYSTEM

FIELD OF THE INVENTION

The present invention relates generally to fiber optic interconnection enclosures and, more particularly, to techniques for reducing contamination within a fiber optic interconnection enclosure.

BACKGROUND OF THE INVENTION

Fiber optic networks are widely utilized for communications, data transmission and other applications. Regardless of the application, fiber optic networks generally provide for the interconnection or optical coupling of various ones of the optical fibers in order to facilitate the distribution, branching or other routing of the optical signals.

In order to facilitate the interconnection of a plurality of optical fibers, a fiber optic network in a central office generally includes a plurality of fiber optic distribution frames or other fiber optic interconnection enclosures, such as fiber optic cross-connect units, interconnect boxes, patch panels or the like. As is known to those skilled in the art, a fiber optic distribution frame generally includes a plurality of connector panels, each of which has a number of connector sleeves for interconnecting, i.e., cross-connecting, respective pairs of optical fibers. While the connector panels are generally vertically arranged within a fiber optic distribution frame, the connector panels can be angled or slanted, if so desired.

A conventional fiber optic distribution frame receives a plurality of incoming fiber optic cables, each of which has a number of optical fibers. In addition, a number of outgoing optical fibers also emerge from the fiber optic distribution frame for routing throughout a building or the like. In order to appropriately interconnect respective optical fibers of the incoming fiber optic cables and the outgoing optical fibers following connectorization of the optical fibers, a technician connects a connector mounted upon each of the incoming and outgoing optical fibers with respective connector sleeves. Typically, the technician connects the connectorized optical fibers to the respective connector sleeves from one side, typically the rear side, of the fiber optic distribution frame. By then accessing the other side of the distribution frame, a technician can connect pairs of the incoming and outgoing optical fibers. In particular, a technician can connect the opposite ends of a fiber optic jumper or other relatively short length of optical fiber upon which connectors have been mounted to the opposite ends of the connector sleeves to which the respective incoming and outgoing optical fibers are connected. Thus, the incoming optical fiber is optically connected to one end of the fiber optic jumper while the outgoing optical fiber is optically connected to the other end of the fiber optic jumper, thereby optically interconnecting the incoming and outgoing optical fibers. As known to those skilled in the art, a fiber optic distribution frame not only permits a relatively large number of optical fibers to be interconnected in an efficient manner, but a fiber optic distribution frame permits reconfiguration of the fiber optic network by merely rearranging the manner in which the fiber optic jumpers interconnect respective ones of the incoming and outgoing optical fibers.

Although fiber optic networks are widely utilized, certain applications, such as certain optical communications applications, are demanding ever increasing levels of performance, such as reduced attenuation and reflections. In addition, fiber optic networks, such as those fiber optic networks employing Erbium Doped Fiber Amplifiers (EDFAs) and Wavelength Division Multiplexing (WDM), oftentimes require high power densities within the fiber cores. As a result, the accumulation of even a small amount of dirt or other contaminants upon the core region of the end face of an optical fiber can cause serious system degradation and, in some instances, catastrophic fiber damage.

Unfortunately, conventional fiber optic distribution frames permit particles, such as dust and other contaminants, to settle on all exposed surfaces during the initial set-up or during subsequent reconfiguration of the fiber optic distribution frame. As such, a certain percentage of the particles will eventually settle on or be transferred to the end faces of the interconnected optical fibers.

As will be apparent to those skilled in the art, the accumulation of particles, such as dust or other contaminants, on the end face of an optical fiber increases the attenuation and the reflection of the optical signals and will otherwise impair the efficiency with which optical signals are coupled between the optical fibers. As such, a technician must generally clean the end faces of the optical fibers each time that the optical fibers are disconnected to prevent an excessive number of particles from accumulating upon or being transferred to the end faces of the optical fibers. As described above, the failure to adequately clean the end faces of the optical fibers can decrease the operational efficiency of the fiber optic network and, in regards to fiber optic networks having optical fibers that support high power densities in the fiber cores, can lead to severe system degradation and, in some instances, catastrophic fiber damage.

SUMMARY OF THE INVENTION

A fiber optic interconnection enclosure, such as a fiber optic distribution frame, a fiber optic cross-connect unit, an interconnect box, a patch panel or the like, is provided according to the present invention which includes a forced air system for effectively limiting the entry of particles, such as dust and other contaminants, into the enclosure. The fiber optic interconnection enclosure includes a housing which defines an internal cavity and an air inlet port. According to one advantageous embodiment, the fiber optic interconnection enclosure draws air into the enclosure through the air inlet port and circulates the air through the internal cavity in order to reduce the number of particles that settle upon or are transferred to the end faces of the optical fibers or other surfaces within the enclosure. By filtering the air drawn into the internal cavity, such as with a filter disposed within the air inlet port, at least some of the particles are removed from the air drawn into the internal cavity. In addition, by expelling at least some of the air that has circulated within the internal cavity through a vent, typically defined by a lower portion of the housing, a number of the particles that may have been otherwise trapped within the internal cavity can also be expelled prior to settling upon the end face of an optical fiber or any other surface within the enclosure.

According to one advantageous embodiment, the fiber optic interconnection enclosure maintains a greater pressure, i.e., a positive pressure, within the internal cavity than outside of the internal cavity. As such, the fiber optic interconnection enclosure of this embodiment effectively limits the entry of particles, such as dust and other contaminants, into the internal cavity, even as the door of the fiber optic interconnection enclosure is repeatedly opened and closed.

According to either embodiment, the housing of the fiber optic interconnection enclosure also preferably defines first and second openings in communication with the internal cavity that are adapted to receive optical fibers that are interconnected therein. The housing also includes at least one door for accessing the internal cavity. In addition, the fiber optic interconnection enclosure of the present invention generally includes means, such as one or more connector panels, disposed within the internal cavity for interconnecting respective ends of the optical fibers.

In order to maintain the internal cavity at a greater pressure than the surroundings, the fiber optic interconnection enclosure of one advantageous embodiment includes means, such as at least one fan, disposed in fluid communication with the air inlet port and the internal cavity, for drawing air through the air inlet port. Preferably, the means for maintaining a greater pressure within the internal cavity also includes means, also typically provided by the at least one fan, for circulating air through the internal cavity so as to reduce the number of particles that settle upon or are transferred to the end faces of the optical fibers or upon other surfaces within the internal cavity.

The fan of one embodiment is positioned within an upper portion of the housing so as to draw air into the internal cavity through the air inlet port. In addition, the lower portion of the housing of this advantageous embodiment preferably defines a vent for facilitating circulation of air downwardly through the internal cavity such that a portion of the circulating air and at least some of the particles that would otherwise have been trapped within the internal cavity are expelled or exhausted.

In order to further reduce the number of particles that enter the internal cavity upon opening the door, the fiber optic interconnection enclosure can include a number of other features. For example, the fiber optic interconnection enclosure of one advantageous embodiment includes means, such as at least one secondary fan, for directing a curtain of air at least partially across the door opening exposed by movement of the door to the second open position. Advantageously, the at least one secondary fan is positioned within the upper portion of the cabinet so as to direct a curtain of air downwardly across the respective door opening. The fiber optic interconnection enclosure of this advantageous embodiment can also include a sensor for detecting movement of the door from a first closed position to a second open position. As such, the sensor can actuate the at least one secondary fan such that the at least one secondary fan creates a curtain of air each time that the door is opened. The fiber optic interconnection enclosure of this advantageous embodiment therefore further limits the number of particles that enter the internal cavity upon opening the door.

In order to reduce the number of particles that enter the internal cavity upon opening a door, the housing of one advantageous embodiment includes a plurality of doors, typically smaller doors, for accessing respective portions of the internal cavity. Alternatively, the interior cavity can be divided into inner and outer sections separated by at least one interior door. In order to access a connector panel that is located within the inner section of the internal cavity, a technician will therefore have to open at least two doors, including at least one interior door, to access the inner section of the internal cavity. Since the number of particles are limited in both the inner and outer sections of the internal cavity, the fiber optic interconnection enclosure of this advantageous embodiment further reduces the number of particles that could conceivably settle upon or are transferred to the end faces of the optical fibers or upon other surfaces within the internal cavity.

Accordingly, a fiber optic interconnection enclosure, such as a fiber optic distribution frame, is provided by the present invention which significantly limit entry of particles into the internal cavity within which the optical fibers are connected. The number of particles, such as dust and other contaminants, that settle upon or are transferred to the end faces of the optical fibers or upon other surfaces within the internal cavity is therefore reduced in comparison to conventional fiber optic distribution frames, thereby also reducing the attenuation and reflection of the optical signals transmitted via the optical fibers and helping to prevent serious system degradation or catastrophic fiber damage for fiber optic networks having high power densities. By circulating filtered air through the internal cavity, the fiber optic interconnection enclosure of the present invention further limits the number of particles which settle upon or are transferred to end faces of the optical fibers or other surfaces within the internal cavity. Further, by expelling at least a portion of the circulating air from the internal cavity, the fiber optic interconnection enclosure of the present invention can also expel at least some of the particles that do manage to enter the internal cavity.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
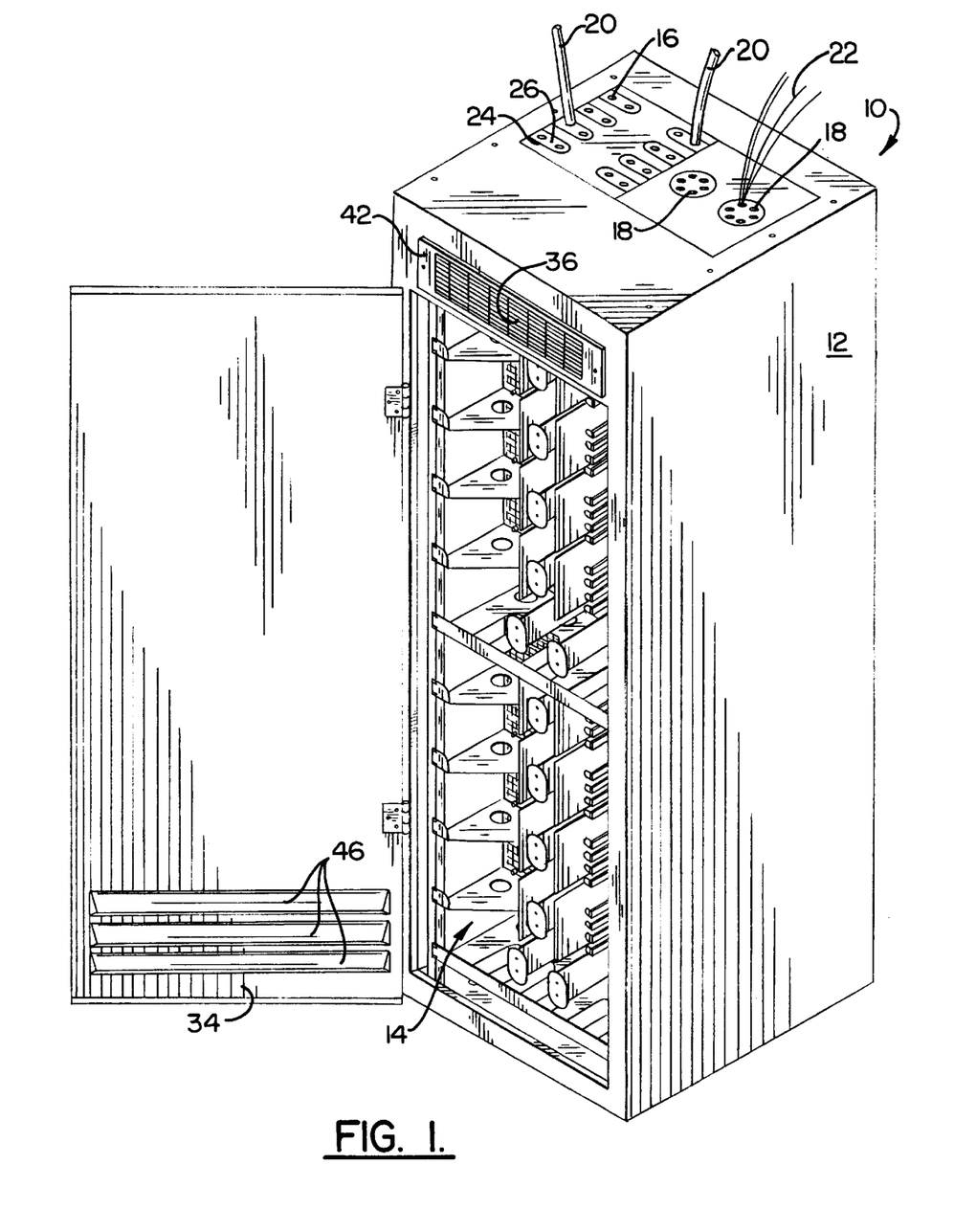
FIG. 1 is a front perspective view of a fiber optic interconnection enclosure according to one embodiment of the present invention.

Referring now to FIG. 1, a fiber optic interconnection enclosure 10 according to one embodiment of the present invention is illustrated. While the fiber optic interconnection enclosure is illustrated to be a fiber optic distribution frame, the fiber optic interconnection enclosure can be a fiber optic cross-connect unit, an interconnect box, a patch panel or other enclosure in which the end faces of two or more optical fibers are mated without departing from the spirit and scope of the present invention. For purposes of illustration, however, a fiber optic distribution frame will be hereinafter discussed.

Typically, a fiber optic distribution frame 10 is located within the central office. However, the fiber optic distribution frame can be positioned at other locations within a fiber optic network without departing from the spirit and scope of the present invention. As illustrated, the fiber optic distribution frame includes a housing, such as a cabinet 12, defining an internal cavity 14. The cabinet also defines first and second openings 16, 18 in communication with the internal cavity for receiving a plurality of incoming and outgoing fiber optic cables and/or buffered optical fibers 20, 22. As illustrated, the first and second openings are generally defined in an upper surface of the cabinet. However, the first and second openings can be defined in other portions of the cabinet without departing from the spirit and scope of the present invention.

As shown in FIG. 1, a plurality of fiber optic cables 20, each of which generally includes a plurality of optical fibers, typically enter the cabinet via the first openings 16. Although the outgoing optical fibers 22 could also be arranged in one or more fiber optic cables, the outgoing optical fibers which exit the cabinet 12 via the second openings 18 are not generally formed into a cable, but are, instead, loosely buffered to facilitate routing of the optical fibers. As such, the first and second openings are typically sized and shaped differently in order to accommodate relatively large incoming fiber optic cables and relatively small outgoing buffered optical fibers.

For example, the cabinet 12 illustrated in FIG. 1 includes a plurality of elongate apertures 24 filled with respective grommets 26. Each grommet, in turn, defines at least one and, more commonly, a pair of openings 16 that can be sized to match the diameter of the fibers optic cable 20 to be extended through the opening. The second openings 18 through which the outgoing buffered optical fibers 22 extend are also generally defined by grommets. Although the second openings are typically much smaller than the first openings, the grommets preferably will size the second openings so as to match the outgoing buffered optical fibers that extend therethrough. However, the cabinet can define first and second openings of different sizes and shapes or of the same size and shape without departing from the spirit and scope of the present invention.

The fiber optic distribution frame 10 of the present invention also includes means, disposed within the internal cavity of the cabinet, for interconnecting, i.e., cross-connecting, respective ones of the incoming and outgoing optical fibers. For example, the means for interconnecting respective ones of the incoming and outgoing optical fibers can be embodied by at least one and, more commonly, a plurality of connector panels 28 disposed within the internal cavity 14 of the cabinet 12. However, the fiber optic distribution frame can include other means for interconnecting respective ones of the incoming and outgoing optical fibers of the fiber optic cables without departing from the spirit and scope of the present invention.

Figure 2:
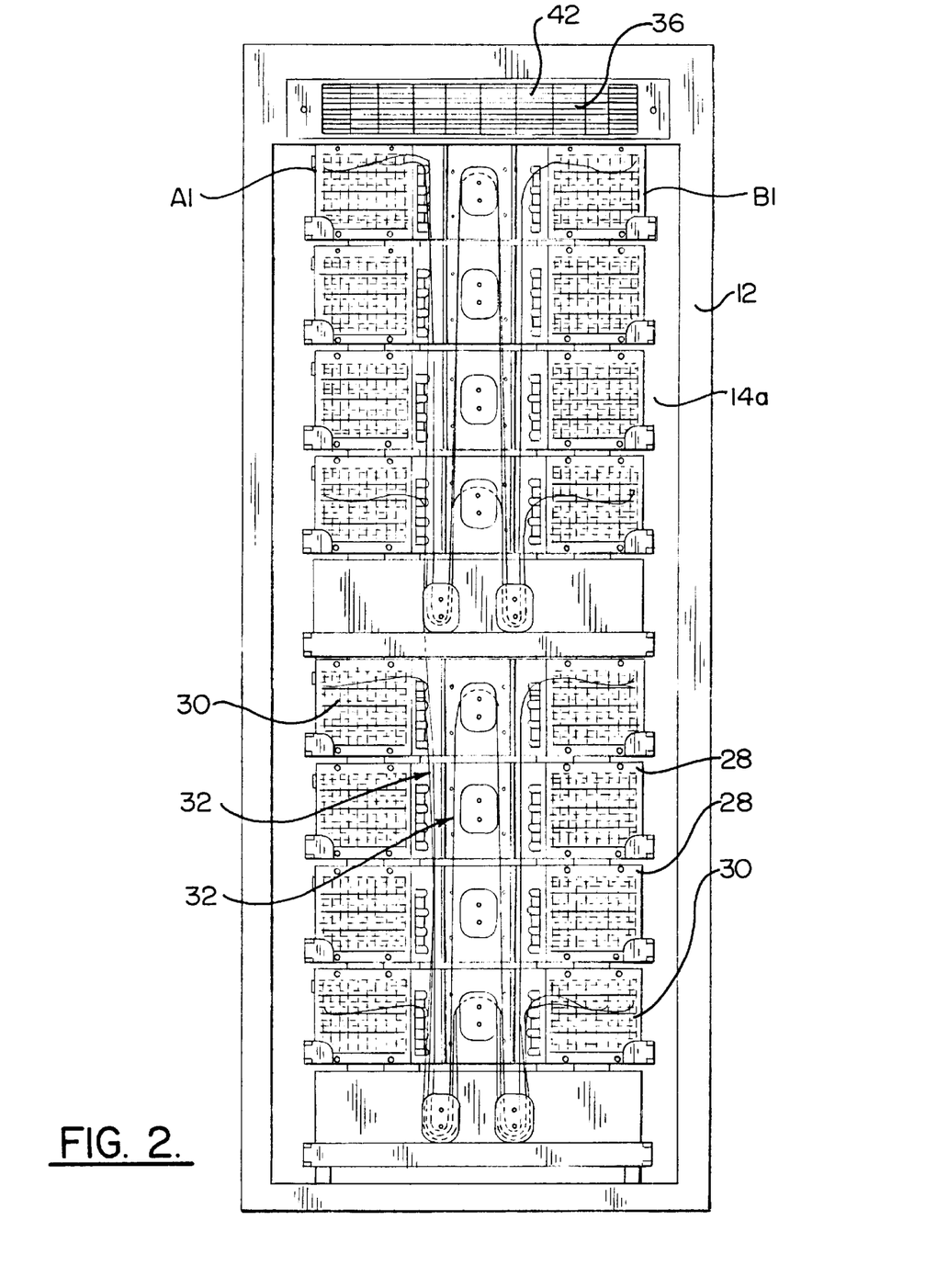
FIG. 2 is an elevational view of the front portion of a fiber optic interconnection enclosure according to one embodiment of the present invention in which the front door has been removed so as to illustrate several fiber optic jumpers extending between various connector sleeves of the connector panels.
Figure 3:
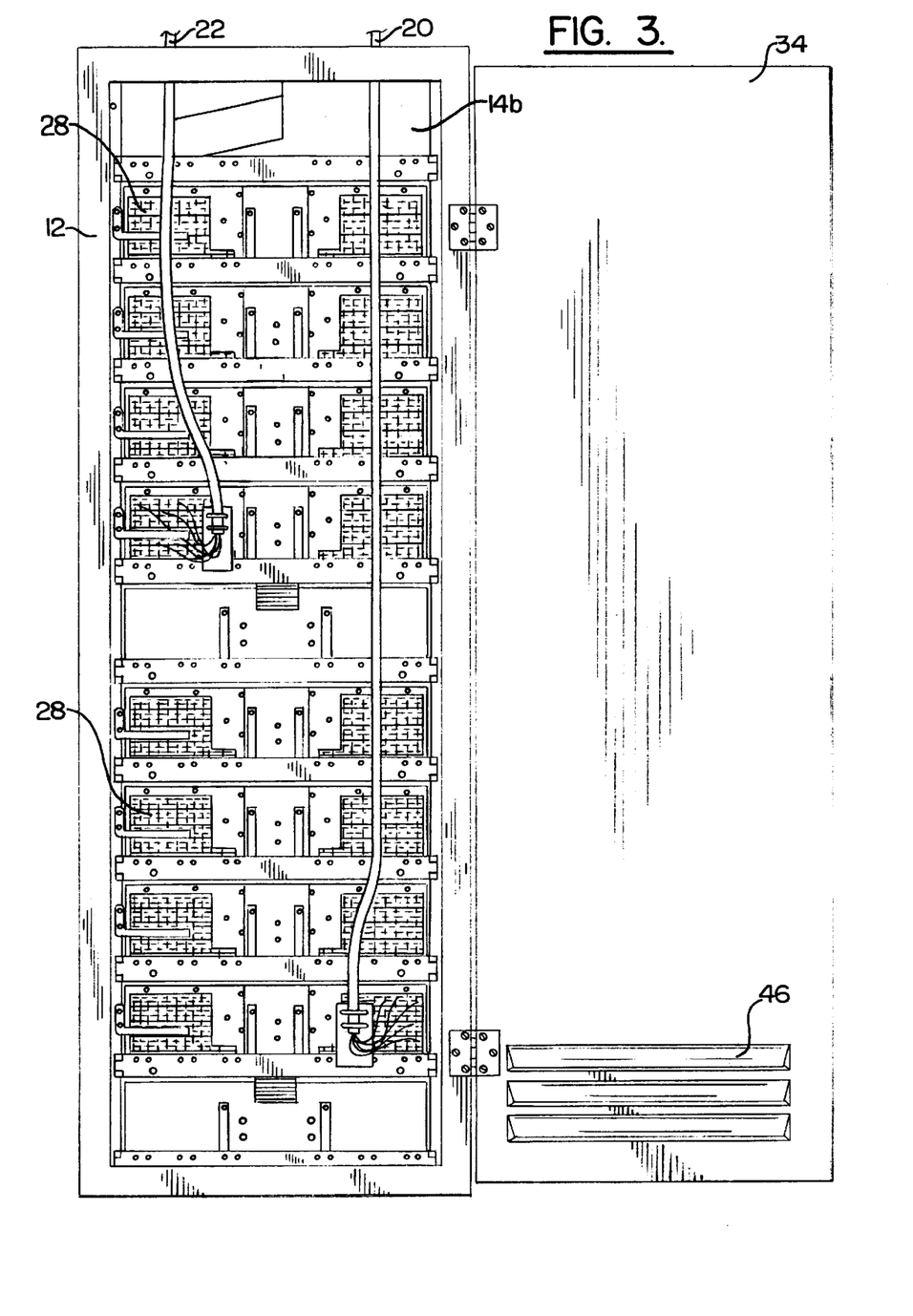
FIG. 3 is an elevational view of the rear portion of a fiber optic interconnection enclosure according to one embodiment of the present invention in which the rear door has been opened so as to illustrate the connection of respective ones of the optical fibers to respective connector sleeves of the connector panels.

With respect to the embodiment of the fiber optic distribution frame 10 which includes a plurality of connector panels 28, the connector panels are generally positioned in a relatively vertical orientation in a center portion of the internal cavity 14 defined by the cabinet 12, thereby dividing the internal cavity into a front portion 14a and a rear portion 14b as shown in FIGS. 2 and 3, respectively. As known to those skilled in the art, each connector panel generally includes an array of connector sleeves 30 which are adapted to receive a predetermined type of fiber optic connector, such as an FC connector. As such, a pair of connectorized optical fibers can be optically interconnected by plugging the fiber optic connectors mounted upon the end portions of the respective optical fibers into the opposite ends of a connector sleeve.

As shown in FIG. 3, the incoming and outgoing optical fibers are preferably connectorized and are inserted into respective connector sleeves 30 of the connector panels 28. As also shown in FIG. 3, the fiber optic distribution frame 10 generally includes a number of guides, storage clips and the like for routing the individual optical fibers to respective connector sleeves in a manner which limits the strain imposed upon the optical fibers while storing excess lengths of the optical fiber in order to facilitate the subsequent reconnectorization or other reconfiguration of the optical fibers.

As illustrated in FIG. 2, pairs of incoming and outgoing optical fibers are interconnected or cross-connected by extending connectorized fiber optic jumpers 32 or other relatively short lengths of connectorized optical fibers between the respective connector sleeves 30 of the connector panels 28 to which the incoming and outgoing optical fibers are connected. As shown in FIG. 2, for example, in order to interconnect the optical fiber connected to incoming connector sleeve A of patch panel 1 and the outgoing optical fiber connected to connector sleeve B of connector panel 2, a fiber optic jumper having opposed, connectorized ends is connected between connector sleeve A of connector panel 1 and connector sleeve B of connector panel 2. As known to those skilled in the art, a fiber optic distribution frame 10 not only facilitates the cross-connection of a plurality of incoming and outgoing optical fibers, but also facilitates reconfiguration of the cross-connects as the fiber optic network changes over time simply by connecting the connectorized fiber optic jumpers between different pairs of connector sleeves.

The fiber optic distribution frame 10 of one advantageous embodiment of the present invention also includes means for obtaining a greater pressure, i.e., a positive pressure, within the internal cavity 14 than outside the internal cavity so as to limit the entry of particles, such as dust and other contaminants, into the internal cavity upon opening a door 34, such as the front door or the rear door. In order to positively pressurize the internal cavity, the door opening can be surrounded by a gasket so as to provide a relatively tight seal upon closing the door, thereby reducing the amount of air that must be drawn into the internal cavity in order to maintain the positive pressure. By maintaining a greater pressure within the internal cavity than outside the internal cavity, air will tend to flow outwardly through the door opening exposed upon moving a door from a first closed position to a second open position, thereby preventing, or at least limiting, the number of particles that enter the internal cavity. While the pressure difference between the internal cavity and the surroundings can be varied depending upon the application, the internal cavity of one advantageous embodiment is maintained at a pressure that is at least 0.002 psi greater than the surroundings.

Figure 4:
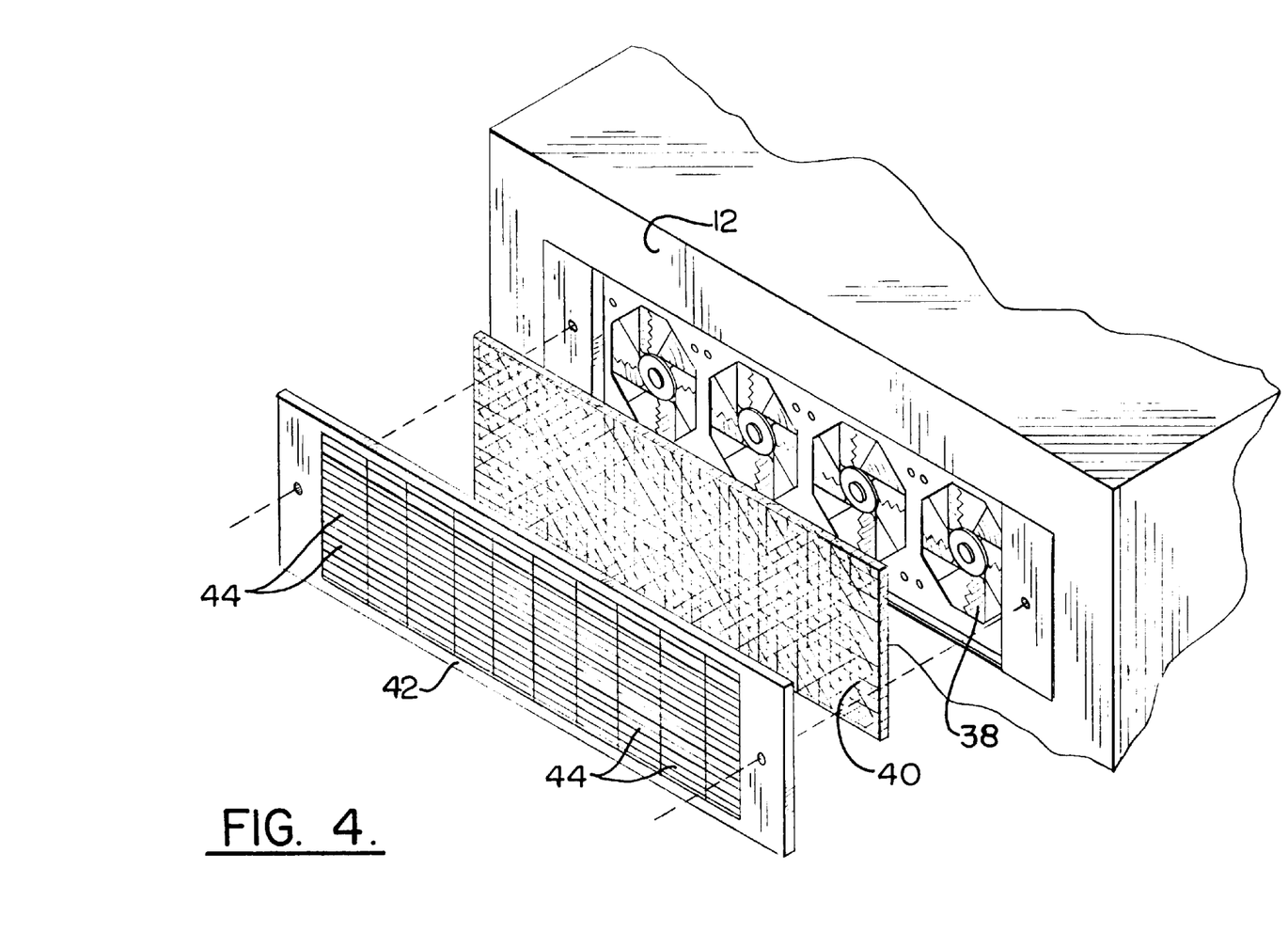
FIG. 4 is an exploded perspective view illustrating a screen, a filter, and a plurality of fans for circulating air through the internal cavity of a fiber optic interconnection enclosure according to one embodiment of the present invention.

As illustrated in FIGS. 1 and 2, the cabinet 12 of the fiber optic distribution frame 10 of this embodiment also defines an air inlet port 36 in communication with the internal cavity 14. As such, the means for maintaining a greater pressure within the internal cavity than outside the internal cavity preferably includes means for drawing air through the air inlet port and into the internal cavity. As illustrated in FIG. 4, for example, the means for drawing air through the air inlet port and for maintaining greater pressure within the internal cavity than outside the internal cavity preferably includes at least one and, more commonly, a plurality of fans 38, such as four horizontally disposed fans, which draw air through the air inlet port and which direct the air into the internal cavity. While fans of a variety of sizes can be utilized without departing from the spirit and scope of the present invention, the fans of one advantageous embodiment are each adapted to move 110 cubic feet of air per minute (cfm). Although the fans can be designed to operate at a single speed, the fans can have two speeds with a low speed for operation when the doors 34 of the fiber optic distribution frame 10 are closed and a higher speed for operation when one of the doors is opened. In addition, one fiber optic frame distribution frame can include a warning system to provide an alert, either audible and/or visual, if a fan should lose speed or become blocked.

According to one embodiment, the air inlet port 36 is defined in an upper portion of the cabinet 12. As such, the plurality of fans 38 can also be positioned within an upper portion of a cabinet so as to draw air through the air inlet port. However, the fans can be positioned within other portions of the cabinet or the fans can be exterior to the cabinet, if so desired, so long as the fans are connected to the air inlet port by means of ductwork or the like so as to move air through the air inlet port. In this regard, a single bank of fans can be configured to provide air to the air inlet ports of a number of fiber optic distribution frames 10 without departing from the spirit and scope of the present invention.

Figure 5:
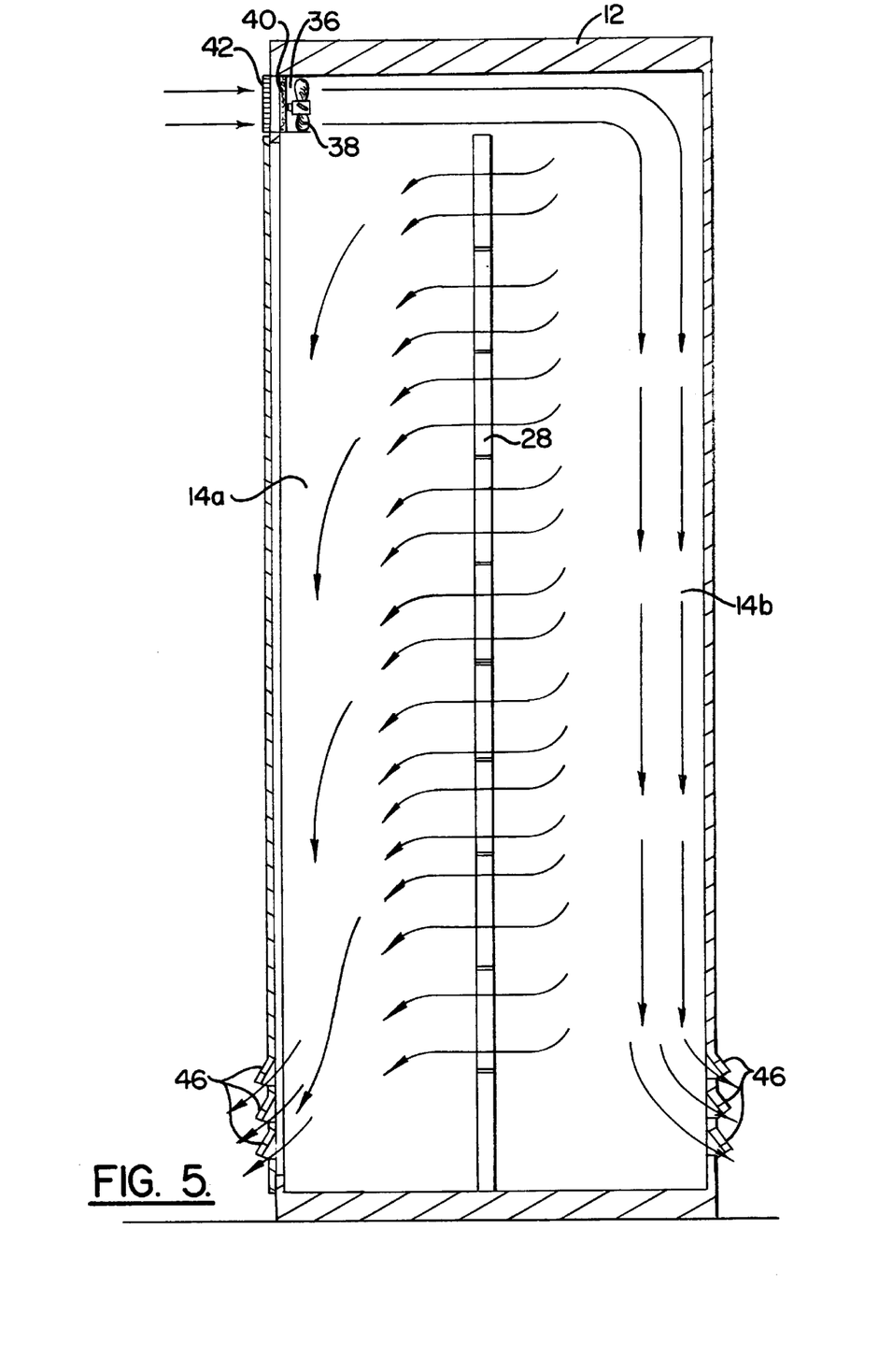
FIG. 5 is a schematic side view of a fiber optic interconnection enclosure according to one embodiment of the present invention in which the connector panels and associated mounting hardware are schematically illustrated so as to more clearly depict air flow through the internal cavity.

As also illustrated in FIG. 5, the fiber optic distribution frame 10 of the present invention preferably includes a filter 40 disposed in fluid communication with the air inlet port 36 and upstream of the fans 38 for removing at least some particles from the air drawn into the internal cavity 14 by the fans. For example, the filter can be an High Efficiency Particulate Air (HEPA) filter or the like which can be configured to remove up to 99.9% of typical airborne particles. While filters designed to remove particles of a variety of sizes can be utilized depending upon the particular application of the fiber optic distribution frame 10 of the present invention, it should be apparent to those skilled in the art that the size of the fans which draw air through the filter and into the internal cavity may have to be increased as the pore size of the filter is decreased. As also shown in FIG. 5, the fiber optic distribution frame can further include a screen 42, typically comprised of a metal frame defining a number of openings 44, that is mounted to the cabinet 12 so as to cover the air inlet port. As such, the screen protects the filter from inadvertent damage and prevents access to the fans.

The means for drawing air through the air inlet port 36 and for maintaining a greater pressure within the internal cavity 14 than outside the internal cavity also preferably include means for circulating air through the internal cavity. In this regard, the plurality of fans 38 illustrated in FIG. 5 also serve to circulate the air drawn through the air inlet port through the internal cavity of the cabinet 12. In this regard, the cabinet can also define one or more vents 46 through which air which is circulated through the internal cavity can be expelled or exhausted. As shown in FIGS. 1 and 3, the fiber optic distribution frame 10 of one advantageous embodiment include louvered vents in the front door and the rear door. However, the cabinet can define the vent in only one of the doors or in a sidewall, without departing from the spirit and scope of the present invention.

While the fiber optic distribution frame 10 can support a variety of air flow patterns, depending upon the position of the air inlet port 36, the fans 38, and the vents 46, the fiber optic distribution frame of FIGS. 1–3 generally draws air in through the air inlet port for circulation downwardly through the internal cavity 14 and outwardly through the vents in the front and rear doors. See, for example, FIG. 5 which provides a schematic representation of the air flow through the fiber optic distribution frame of FIGS. 1–3. In addition to merely flowing downwardly through the internal cavity, the air also flows through holes or other openings defined by or between the connector panels 28. By circulating air through the internal cavity, the fiber optic distribution frame of the present invention significantly reduces the number of particles that settle upon or are transferred to the end faces of the optical fibers or upon other surfaces within the internal cavity. In addition, by exhausting at least a portion of the air that is circulated through the internal cavity through the vents, a number of the particles that would otherwise be trapped within the internal cavity are expelled. Further, by filtering the air drawn into the internal cavity, the size, the number of particles that enter the internal cavity are limited. By reducing the number of particles, such as dust and other contaminants, that accumulate upon or are transferred to the end faces of the optical fibers, the optical signals transmitted by the various optical fibers may be attenuated to a much lesser degree than in conventional fiber optic distribution frames. In addition, reducing the number of particles that accumulate upon or are transferred to the end face of the optical fibers reduces the chance of serious system degradation or catastrophic fiber damage in those embodiments in which the fiber optic network permits high power densities in the core of the optic fibers.

While the fiber optic distribution frame 10 illustrated in FIGS. 1–3 and described above significantly reduces the number of particles which settle upon surfaces within the internal cavity 14, the fiber optic interconnection enclosure of other embodiments of the present invention can include additional features which further reduce the number of particles which enter the internal cavity defined by the cabinet 12. For example, the fiber optic distribution frame of one embodiment schematically illustrated in FIG. 6 includes a sensor, such as a mechanical contact sensor 48, an optical sensor or the like, for detecting movement of the door 34 from a first closed position to a second open position, in which the door opening defined by the cabinet is exposed.

Figure 6:
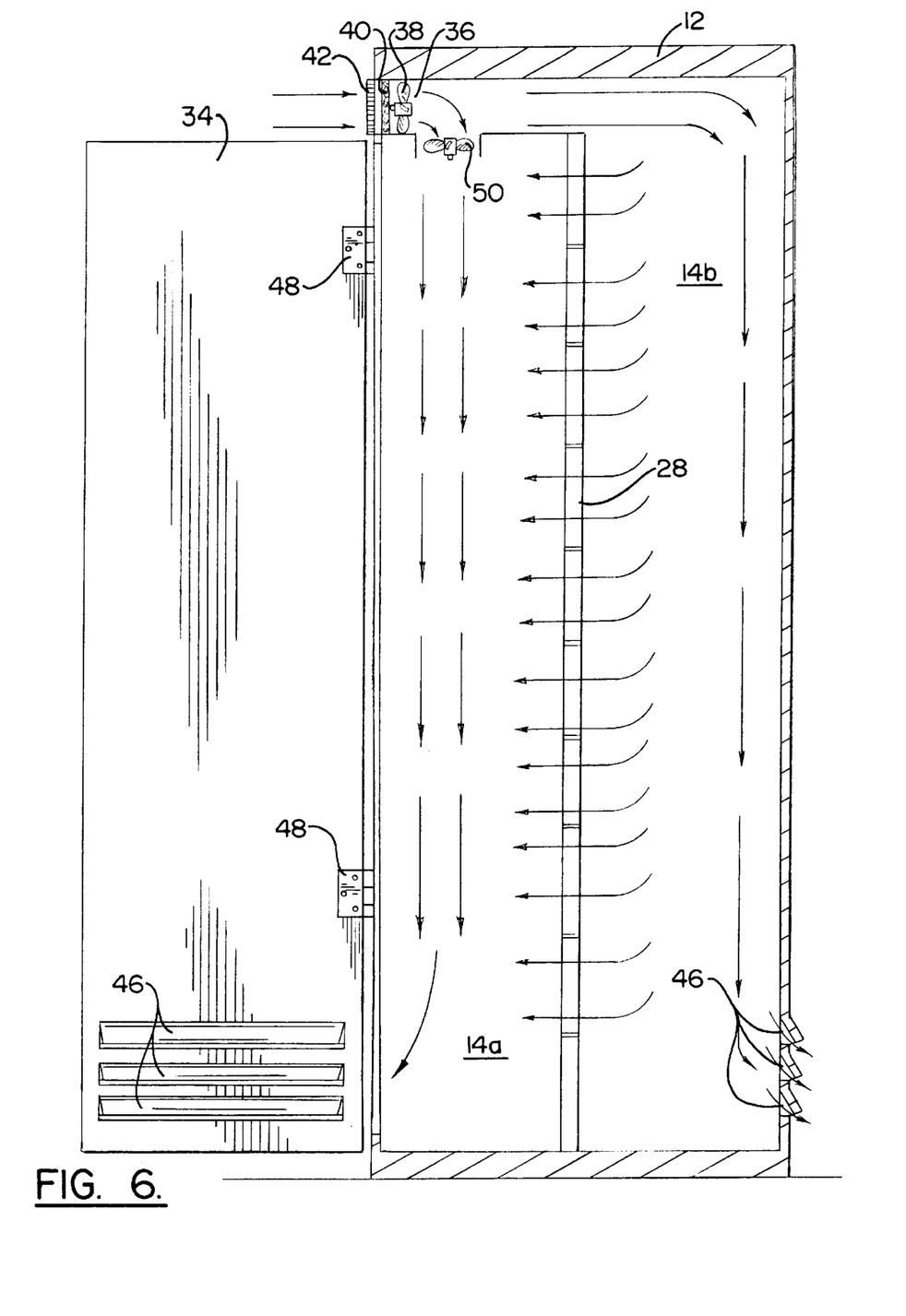
FIG. 6 is a schematic side view of a fiber optic interconnection enclosure according to another embodiment of the present invention in which the front door is open and the connector panels and associated hardware are schematically illustrated so as to more clearly depict a sensor and a set of secondary fans for directing a curtain of air at least partially across the door opening.

According to this embodiment, the fiber optic distribution frame 10 also preferably includes means, such as one or more secondary fans 50, for directing a curtain of air at least partially across the respective door opening exposed by moving of the door 34 to the second open position. As shown in FIG. 6, the plurality of secondary fans are operably mounted within the cabinet 12 and are responsive to the sensor 48 for directing a curtain of air at least partially across the respective door opening once the sensor indicates that the door has been moved to the second open position. As described above in conjunction with the plurality of fans for drawing air into the internal cavity 14 through the air inlet port 36, the plurality of secondary fans are also preferably positioned within an upper portion of the cabinet and are oriented in a generally vertical direction so as to direct a curtain of air downwardly across the respective door opening exposed by movement of the door to the second open position.

While the sensor 48 and the plurality of secondary fans 50 can communicate in a variety of manners, including directly or via other electronic components, such as a microprocessor or the like, the sensor of one advantageous embodiment generates a signal upon detecting movement of the door 34 to the second open position. The sensor then provides this signal to the plurality of secondary fans for actuating or turning on the plurality of secondary fans. Once the door has been closed, i.e., moved to a first closed position, the sensor of this advantageous embodiment will no longer generate the signal and the plurality of secondary fans will be deactivated or turned off. While the door is open and the plurality of secondary fans are operating, however, the curtain of air that is directed across the respective door opening further limits the number of particles, such as dust or other contaminants, which enter the internal cavity 14 defined by the cabinet 12.

Figure 7:
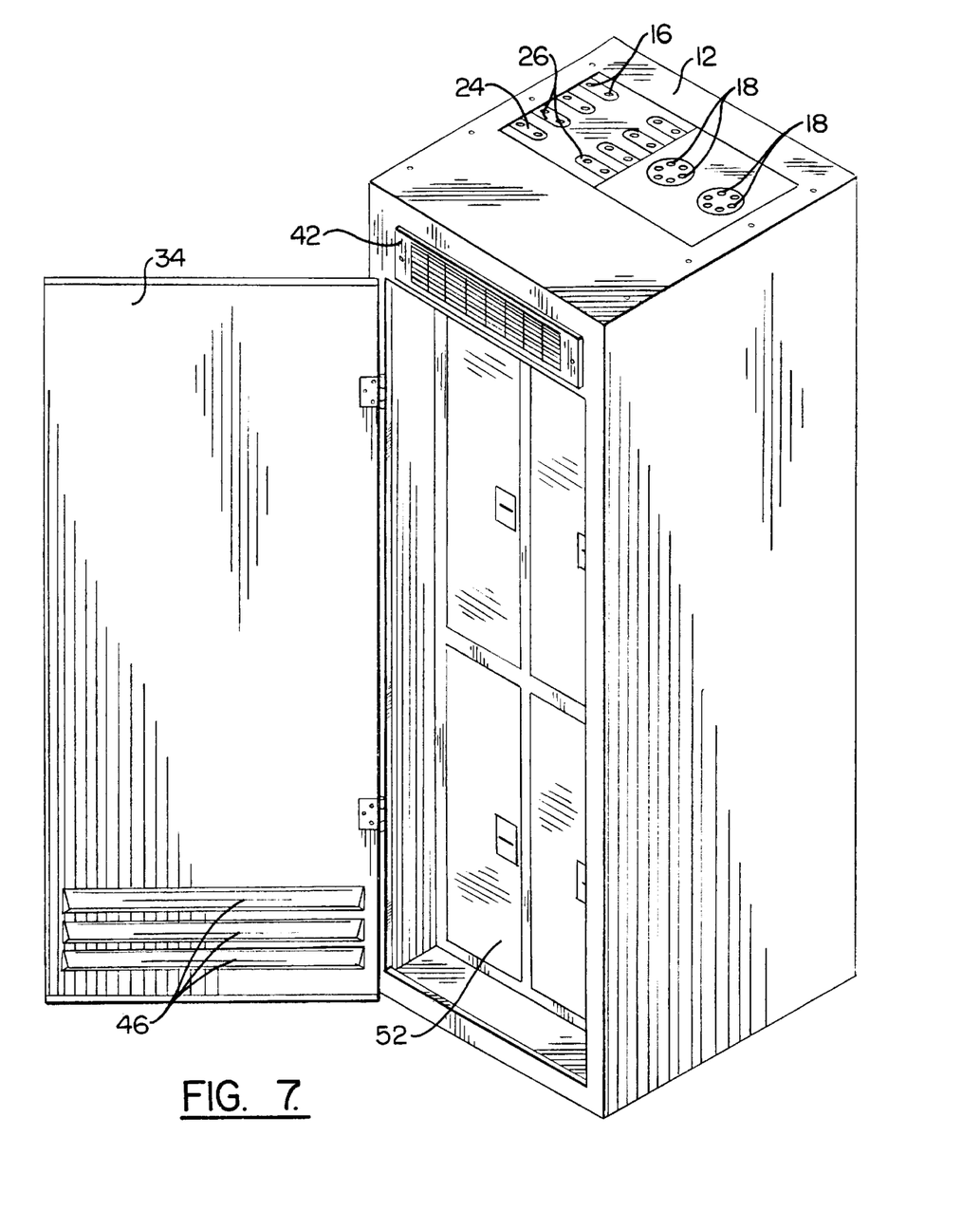
FIG. 7 is a perspective view of a fiber optic interconnection enclosure according to another embodiment of the present invention in which the internal cavity is divided into inner and outer sections separated by a plurality of interior doors in order to further limit entry of particles into the inner section of the internal cavity in which the connector panels are housed.

According to another embodiment illustrated in FIG. 7, the internal cavity 14 defined by the cabinet 12 of the fiber optic distribution frame 10 can be divided into inner and outer sections that are separated by at least one interior door 52. As such, an outer door 34, such as the front door, must be opened to access the outer section of the internal cavity. In order to access the inner section of the internal cavity in which the connector panels 28 and the plurality of optical fibers are disposed, however, an additional interior door must also be opened. As described above, the entire internal cabinet, i.e., both the inner and outer sections of the internal cavity, are maintained at a greater pressure than the atmosphere outside the internal cavity, thereby limiting the number of particles that enter the outer section of the internal cavity upon opening the outer door. According to this advantageous embodiment, however, the inner section of the interior cavity can be maintained at an even greater pressure than the outer section of the internal cavity in order to prevent those particles which are in the outer section of the internal cavity from entering the inner section of the internal cavity upon opening the interior door.

In a like fashion to that described above, the fiber optic distribution frame 10 of this embodiment can maintain the inner section of the internal cavity 14 at a greater pressure than the outer section of the inner cavity by drawing additional air into the inner section of the interior cavity, such as by means of another set of fans positioned within another air inlet port. As described above, the pressure differential between the inner and outer sections of the internal cavity is generally not great, such as 0.002 psi, for example. Alternatively, the fiber optic distribution frame of this embodiment can include at least one and, more commonly, a plurality of secondary fans 50 positioned within the inner section of the internal cavity that are actuated upon opening the interior door 52 so as to direct a curtain of air across the door opening exposed by opening the interior door, thereby further limiting the number of particles which can pass from the outer section of the internal cavity to the inner section of the internal cavity.

As shown in FIG. 7, a fiber optic distribution frame 10 can include a plurality of interior doors 52 for accessing respective portions of the inner section of the internal cavity 14. By including a plurality of doors, each door can be made smaller in order to further limit the number of particles which can enter the inner section of the internal cavity upon opening a respective door. Although not illustrated, the fiber optic distribution frame, such as the fiber optic distribution frame illustrated in FIGS. 1–3, can include a plurality of front and/or rear doors for accessing respective portions of the internal cavity in a like fashion to that described above. By including a plurality of front and/or rear doors, the size of each door can be reduced so as to further limit the number of particles which enter the internal cavity upon opening a respective door.

According to the present invention, a fiber optic interconnection enclosure 10, such as a fiber optic distribution frame or the like, is provided which significantly limits entry of particles into the internal cavity 14 within which the optical fibers are connected. The number of particles, such as dust and other contaminants, that settle upon or are transferred to the end faces of the optical fibers or upon other surfaces within the internal cavity is therefore reduced in comparison to conventional fiber optic distribution frames, thereby also reducing the attenuation and reflection of the optical signals transmitted via the optical fibers and helping to prevent serious system degradation or catastrophic fiber damage for fiber optic networks having high power densities. By circulating filtered air through the internal cavity, the fiber optic interconnection enclosure of the present invention further limits the number of particles which settle upon or are transferred to surfaces within the internal cavity. Further, by expelling at least a portion of the circulating air from the internal cavity, the fiber optic interconnection enclosure of the present invention can also expel at least some of the particles that do manage to enter the internal cavity.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A positively pressurized fiber optic distribution frame comprising:

a cabinet defining an internal cavity and an air inlet port in communication with the internal cavity, said cabinet further defining first and second openings in communication with the internal cavity and adapted to receive optical fibers, said cabinet comprising at least one door for accessing the internal cavity;

at least one connector panel disposed within the internal cavity of said cabinet and adapted to permit interconnection of respective ones of the optical fibers; and first means, disposed in fluid communication with the air inlet port and the internal cavity, for drawing air through the air inlet port and into said cabinet, for circulating air through the internal cavity and for maintaining a greater pressure within the internal cavity than outside of the internal cavity so as to limit entry of particles into the internal cavity upon opening said door.

2. A positively pressurized fiber optic distribution frame according to claim 1 wherein said first means comprises at least one fan.

3. A positively pressurized fiber optic distribution frame according to claim 2 further comprising a filter disposed in fluid communication with the air inlet port for removing at least some particles from the air drawn into the internal cavity by said at least one fan.

4. A positively pressurized fiber optic distribution frame according to claim 3 further comprising a screen mounted to said cabinet so as to cover the air inlet port.

5. A positively pressurized fiber optic distribution frame according to claim 2 wherein said at least one fan is positioned within an upper portion of said cabinet.

6. A positively pressurized fiber optic distribution frame according to claim 5 wherein a lower portion of said cabinet further defines a vent for facilitating circulation of air through the internal cavity.

7. A positively pressurized fiber optic distribution frame according to claim 1 wherein said door covers a respective door opening defined by said cabinet and is movable between a first closed position and a second open position, and wherein the positively pressurized fiber optic distribution frame further comprises:
 a sensor for detecting movement of said door to the second open position; and
 second means, responsive to said sensor, for directing a curtain of air at least partially across the respective door opening exposed by movement of said door to the second open position.

8. A positively pressurized fiber optic distribution frame according to claim 7 wherein said second means comprises at least one secondary fan that is positioned within an upper portion of said cabinet so as to direct a curtain of air downwardly across the respective door opening exposed by movement of said door to the second open position.

9. A positively pressurized fiber optic distribution frame according to claim 1 wherein said cabinet further comprises a plurality of doors for accessing respective portions of the internal cavity.

10. A positively pressurized fiber optic distribution frame according to claim 1 wherein the interior cavity is divided into inner and outer sections, and wherein said cabinet further comprises at least one interior door for accessing the inner section of the interior cavity.

11. A fiber optic interconnection enclosure comprising:
 a housing defining an internal cavity and an air inlet port in communication with the internal cavity, said housing further defining first and second openings in communication with the internal cavity and adapted to receive optical fibers such that respective ones of the optical fibers can be interconnected therein;
 at least one fan, disposed in fluid communication with the air inlet port and the internal cavity, for moving air through the air inlet port and into said housing and for circulating air through the internal cavity; and
 a filter, disposed in fluid communication with the air inlet port, for removing at least some particles from the air drawn into the internal cavity by said at least one fan to thereby reduce the particles circulating through the internal cavity.

12. A fiber optic interconnection enclosure according to claim 11 further comprising a screen mounted to said housing so as to cover the air inlet port.

13. A fiber optic interconnection enclosure according to claim 11 wherein said housing further defines a vent for facilitating circulation of air through the internal cavity.

14. A fiber optic interconnection enclosure comprising:
 a housing defining an internal cavity and first and second openings in communication with the internal cavity that are adapted to receive optical fibers such that respective ones of the optical fibers can be interconnected therein, said housing further defining a door opening through which the interior cavity can be accessed, wherein said housing comprises at least one door that covers the door opening and is movable between a first closed position and a second open position; and
 means, disposed in fluid communication with the internal cavity, for directing a curtain of air at least partially across the door opening exposed by movement of said door to the second open position.

15. A fiber optic interconnection apparatus according to claim 14 further comprising a sensor for detecting movement of said door to the second open position, wherein said means for directing a curtain of air at least partially across the door opening is responsive to said sensor such that the curtain of air is initiated once said sensor detects movement of said door to the second open position.

16. A fiber optic interconnection enclosure according to claim 14 wherein said means for directing a curtain of air at least partially across the door opening comprises at least one fan.

17. A fiber optic interconnection enclosure according to claim 16 wherein said at least one fan that is positioned within an upper portion of said housing so as to direct a curtain of air downwardly across the respective door opening exposed by movement of said door to the second open position.

18. A fiber optic interconnection enclosure according to claim 14 wherein said housing further defines an air inlet port in fluid communication with the internal cavity, and wherein the fiber optic interconnection enclosure further comprises at least one fan, disposed in fluid communication with the air inlet port and the internal cavity, for moving air through the air inlet port and into said housing and for circulating air through the internal cavity.

19. A fiber optic interconnection enclosure according to claim 18 further comprising a filter disposed in fluid communication with the air inlet port for removing at least some particles from the air drawn into the internal cavity by said at least one fan.

20. A fiber optic interconnection enclosure according to claim 19 further comprising a screen mounted to said housing so as to cover the air inlet port.

* * * * *